United States Patent [19]

Muenger

[11] 3,796,547

[45]*Mar. 12, 1974

[54] HEAT EXCHANGE APPARATUS FOR CATALYTIC SYSTEM

[75] Inventor: James R. Muenger, Beacon, N.Y.

[73] Assignee: Texaco Inc., New York, N.Y.

[ * ] Notice: The portion of the term of this patent subsequent to May 30, 1989, has been disclaimed.

[22] Filed: Dec. 17, 1971

[21] Appl. No.: 209,267

Related U.S. Application Data

[63] Continuation-in-part of Ser. No. 880,255, Nov. 26, 1969.

[52] U.S. Cl. .................... 23/288 L, 23/289, 48/197, 122/333, 165/140, 165/157, 252/373
[51] Int. Cl. ............................................. B01j 9/04
[58] Field of Search .................. 23/288 L, 289, 284; 252/373; 48/196; 122/333; 165/140, 157

[56] References Cited
UNITED STATES PATENTS

| 3,666,423 | 5/1972 | Muenger | 23/288 L |
| 3,666,682 | 5/1972 | Muenger | 252/376 |

Primary Examiner—James H. Tayman, Jr.
Attorney, Agent, or Firm—T. H. Whaley; C. G. Ries

[57] ABSTRACT

A heat exchange apparatus for an exothermic catalytic system comprising a closed cylindrical vessel containing a removable axial spine which extends through the top and bottom heads of said vessel. Two separate heat exchangers are embedded in catalyst within said vessel and are supported by said axial spine as a removable unit and are in communication therewith. The axial spine contains passageways for separately introducing and removing two separate coolant streams into said heat exchangers. The first coolant stream consists of unreacted fresh feedstream which is thereby preheated before it is introduced into the catalyst surrounding each heat exchanger. The second coolant stream is water or an organic liquid from an external source. Both coolant streams pass in noncontact concurrent heat exchange with the feedstream undergoing exothermic chemical reaction as it passes up through the catalyst surrounding each heat exchanger. The product stream leaves from the top of the catalyst and is discharged through an exit port in the top head of the vessel.

3 Claims, 9 Drawing Figures

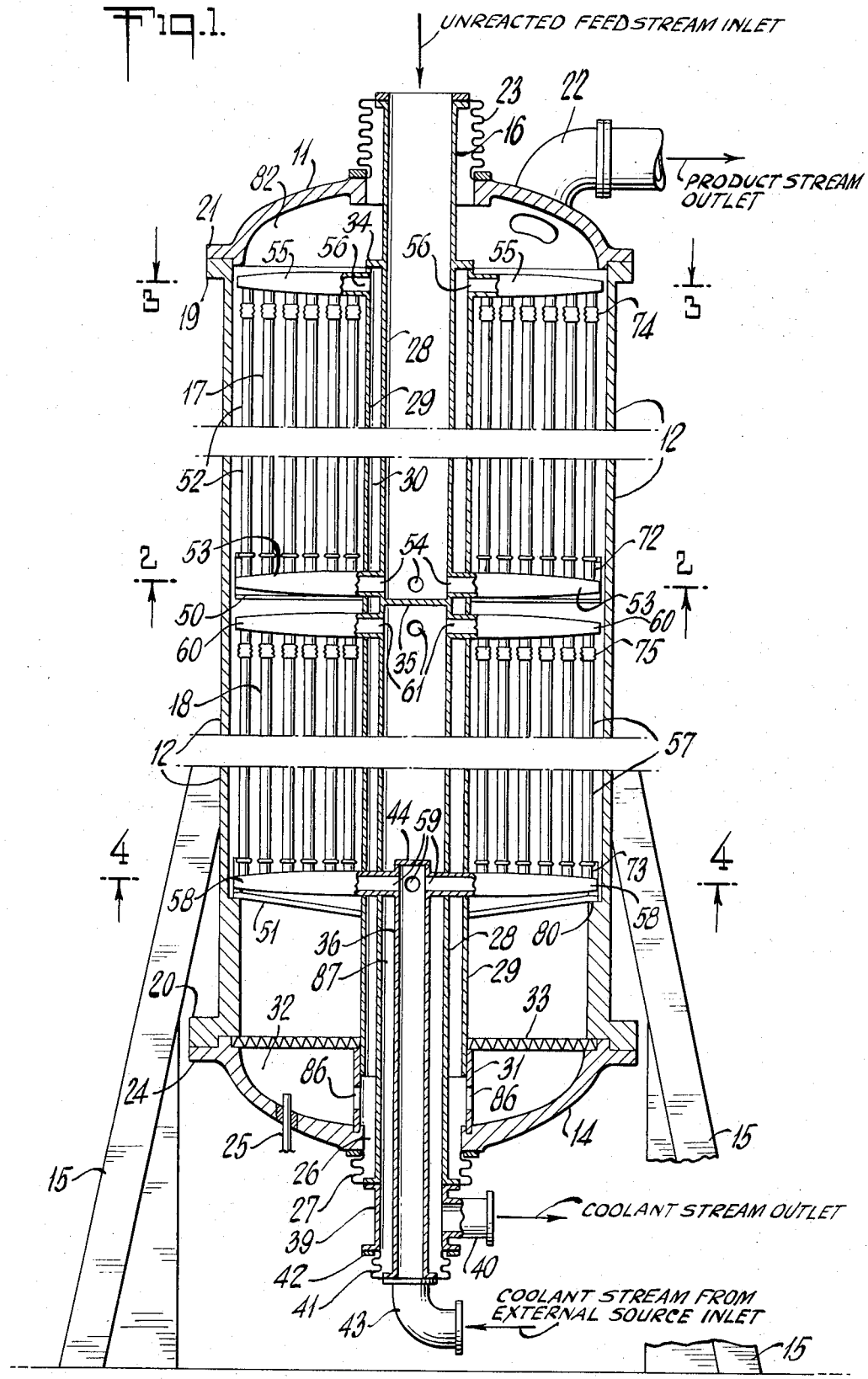

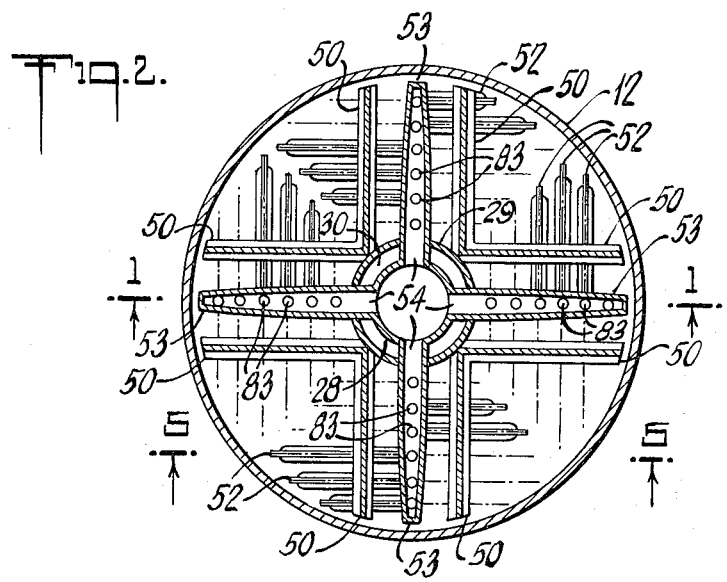
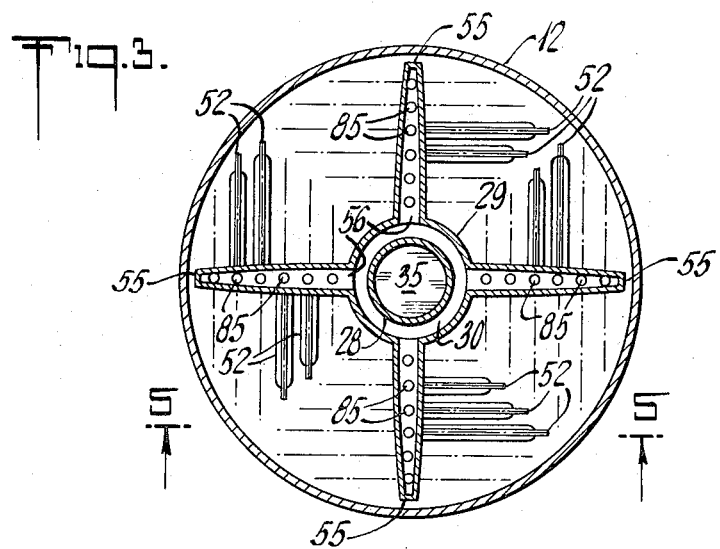
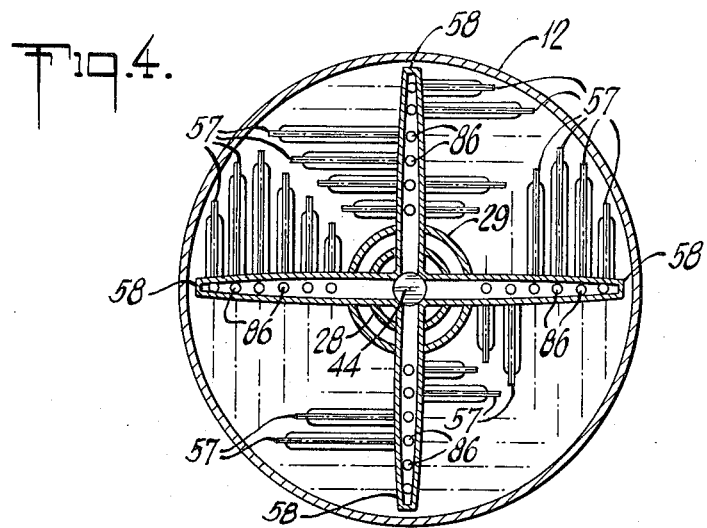

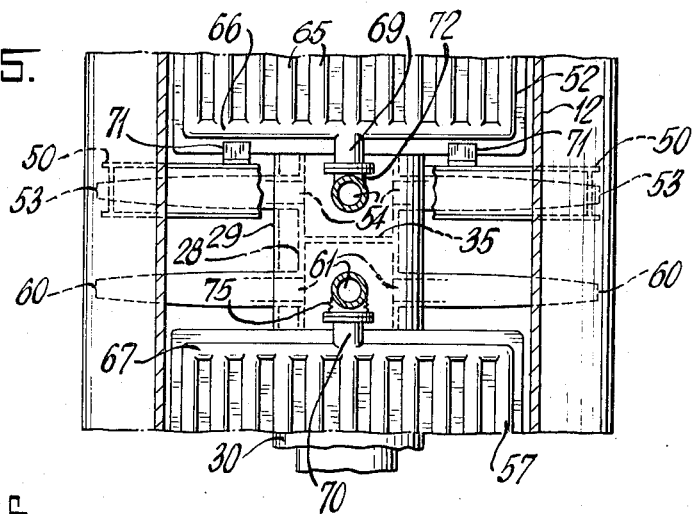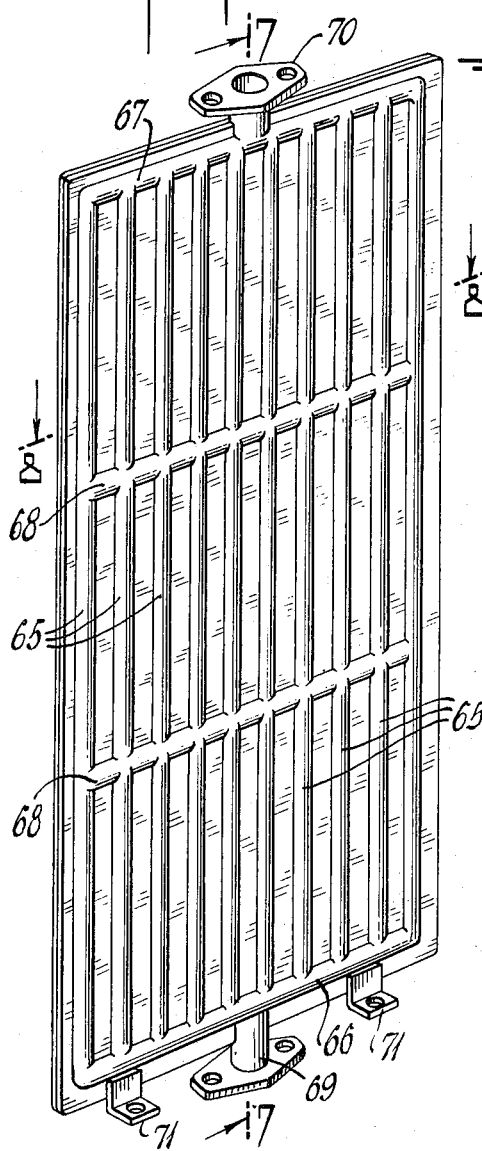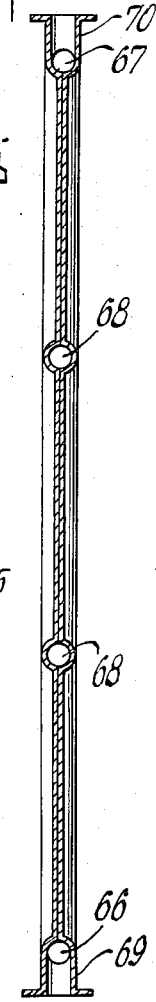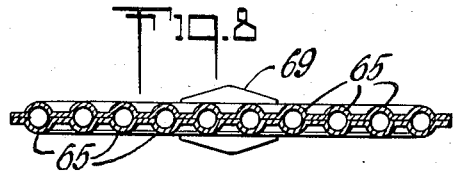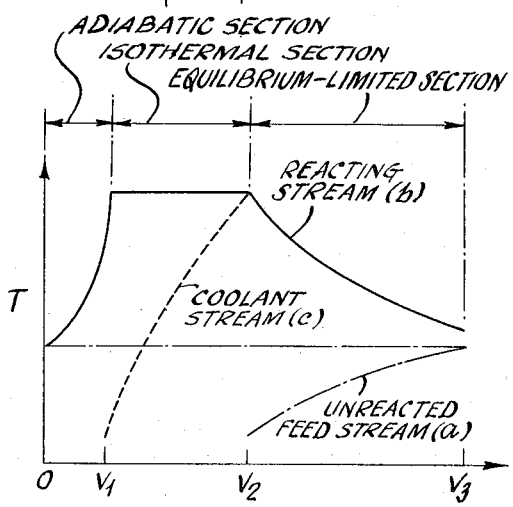

HEAT EXCHANGE APPARATUS FOR CATALYTIC SYSTEM

This application is a continuation-in-part of copending coassigned application Ser. No. 880,255 filed Nov. 26, 1969 by James R. Muenger, and which issued as U.S. Pat. No. 3,666,423 on May 30, 1972.

BACKGROUND OF THE INVENTION

Field of the Invention

This invention relates to an apparatus for conducting catalytic exothermic chemical reactions. In one of its more specific aspects it relates to a shift converter containing two separate heat exchange units supplied with two separate coolant streams.

DESCRIPTION OF THE PRIOR ART

In prior art apparatus which involve exothermic catalytic gas phase reactions, the surplus reaction heat is often conducted away by techniques such as: external cooling of the reactant gas between catalyst beds by indirect heat exchange; directly introducing water or some other coolant into the space between the catalyst beds; and preheating the feed gas by indirect heat exchange with the product gas in an external heat exchanger. The disadvantages of said prior art apparatus include: non-optimum temperature control of the reaction, excessive catalyst requirement, excessive volume of the reactor, decreased conversion, and the need for and the expense of external heat exchange.

The catalytic water-gas shift conversion reaction is a well known exothermic reaction which is widely used for the manufacture of hydrogen and ammonia synthesis gas. It is also commonly used in processes for producing feedstock streams of gaseous mixtures of hydrogen and carbon monoxide for use in the chemical synthesis of oxygen containing organic compounds.

The water-gas shift reaction is represented stoichiometrically as follows:

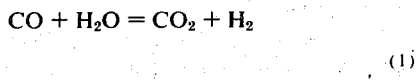

$$CO + H_2O = CO_2 + H_2$$

(1)

About 16,700 BTU's are liberated for each pound mole of CO converted. Heat removal and temperature control are therefore necessary to prevent destruction of the catalyst and to attain the desired CO conversion. Ordinarily, the reaction temperature is held in the range of 350° to 1,050°F. (depending upon the catalyst used) by employing two or three separate fixed beds of catalyst. The shifted gases from one bed may be passed through an external heat exchanger and cooled from a high temperature to a comparatively low temperature before being introduced into the next bed.

In such conventional systems the exit temperature from the last bed is not the minimum shifted gas temperature in the system, as it should be from ideal considerations for achieving maximum CO conversion. Further, reaction rates are slow at the beginning of each bed, since the bed temperature is lowest at that point. These disadvantages and others found with conventional shift converters are overcome by the subject invention.

SUMMARY

In one specific embodiment, the apparatus comprises a closed elongated vertical pressure vessel containing a removable sub-assembly comprising a plurality of axially aligned superimposed separate heat exchangers attached to an axial spine. The spine comprises a plurality of concentric pipes which also provides ingress and egress for two separate streams of coolant fluids. Unreacted feedstream is the coolant in one heat exchanger while a stream of $H_2O$ or other suitable fluid from an external source is the coolant in the other heat exchanger. Both coolant streams are in noncontact, i.e., indirect, concurrent flow heat exchange with the stream of feed gas undergoing exothermic chemical reaction as it passes successively through the catalyst surrounding each heat exchanger.

By this means, the reacting stream is passed through the reaction vessel with a desired temperature profile.

In a specific example, a water-gas shift feed gas mixture containing supplemental $H_2O$ is passed through a heat exchanger embedded in conventional water-gas shift catalyst, e.g., iron oxide-chromium oxide. By concurrent indirect heat exchange between the feed gas mixture on the inside of the heat exchangers and the reacting gases on the outside of the heat exchanger, the feed gas mixture is preheated. The preheated feed gas mixture is then passed through shift catalyst in three contiguous sections where exothermic reaction takes place while the temperature profile of the reacting gas mixture is controlled.

In the first section the feedstream is raised to a maximum temperature that the catalyst may withstand over a long period of time without deteriorating, e.g., 2,000 hours. In the second section the maximum temperature of the reacting stream is held constant until more than about 80 percent of the CO is converted. In the third section, the temperature of the reacting gas is gradually lowered until more than about 90 percent of the CO is converted. Finally, product gas rich in $H_2$ is discharged from an exit port in the top head of the reactor.

BRIEF DESCRIPTION OF THE DRAWING

The invention will be further understood by reference to the accompanying drawing in which:

FIG. 1 is diagrammatic representation of the heat exchange apparatus in vertical cross section taken along the line 1—1 of FIG. 2.

FIG. 2 is a horizontal cross sectional view of the apparatus of FIG. 1, taken along the line 2—2, of FIG. 1.

FIG. 3 is a horizontal cross sectional view of the apparatus of FIG. 1, taken along the line 3—3, of FIG. 1.

FIG. 4 is a horizontal cross sectional view of the apparatus of FIG. 1, taken along line 4—4, of FIG. 1.

FIG. 5 is a fragmental vertical cross sectional view of the lower portion of the upper heat exchanger unit and the upper portion of the lower heat exchanger unit taken along line 5—5 of FIG. 2.

FIG. 6 is a perspective view of a typical heat exchange element.

FIG. 7 is a vertical cross sectional view of FIG. 6, taken through line 7—7 of FIG. 6.

FIG. 8 is a horizontal cross sectional view of FIG. 6, taken through line 8—8 of FIG. 6.

FIG. 9 is a graphical representation of a temperature profile illustrating average temperatures of reactants along the length of the shift converter in a specific example of a water-gas shift reaction.

DESCRIPTION OF THE INVENTION

The present invention pertains to an apparatus for conducting a liquid or gas phase exothermic catalytic reaction in which the temperature profile is controlled to yield maximum conversion with a minimum quantity of catalyst.

The apparatus is particularly applicable to all reactions which have the following characteristics: the reaction is exothermic; kinetics are favored by high temperatures; conversion equilibrium is favored by low temperatures; feed-heating and product-cooling are desired or permissible in the overall process; a maximum-permissible catalytic temperature may be imposed upon the process; and a separate coolant stream from an external source is available to assume a portion of the cooling load. Typical processes which are applicable include: water-gas shift reaction to produce hydrogen and carbon dioxide from carbon monoxide and steam, methane synthesis, and hydrogenation of hydrocarbons.

The present invention pertains to an apparatus for conducting a continuous exothermic chemical reaction process within a reaction vessel containing catalyst such as disclosed in my copending application Ser. No. 209,238 filed concurrently herewith. A short description of the steps in said exothermic process follows to enable one to better understand the nature of the apparatus:

1. preheating, within the first section of a reaction vessel comprising three contiguous sections, an unreacted gaseous feedstream comprising a mixture of reactants by passing said feedstream as a coolant through a first heat-exchange unit embedded in catalyst in said first section in concurrent flow and indirect heat exchange with a reacting portion of said feedstream ascending from the second section of said reaction vessel and passing through the catalyst on the outside of said first heat-exchange unit while undergoing additional exothermic reaction, thereby gradually reducing the temperature of the reacting feedstream in said first section, while generally increasing the temperature of the unreacted gaseous feedstream;
2. discharging from the reaction vessel a product gas stream leaving from the top of the catalyst in the first section in step (1);
3. introducing the preheated unreacted feedstream leaving the first heat-exchange unit in step (1) into catalyst in the third section located immediately below the second heat-exchange unit in said reaction vessel and adiabatically reacting together therein reactants in said feedstream, thereby increasing the temperature of said reacting feedstreams preferably to a maximum that the catalyst may withstand for an extended period of operations, e.g., longer than about 2,000 hours;
4. passing the reacting gas stream leaving step (3) through the catalyst in the second section on the outside of and surrounding said second heat-exchange unit in concurrent flow and indirect heat exchange with a stream of coolant from an external source which is passed through said second heat-exchange unit, whereby the temperature of said stream of reacting gas in said second section is maintained substantially constant over the entire length of said second section and while simultaneously the temperature of said stream of coolant is gradually increased; and
5. introducing the reacting gas stream leaving the catalyst in the second section in step (4) into the catalyst in the first section in step (1), as previously described in step (1).

LeChatelier's principle states that in exothermic reactions equilibrium composition shifts toward completion of the reaction as temperature decreases. However, the kinetics of the reaction are favored by high temperatures. The maximum temperature is established by the thermal resistance of the catalyst. In the subject apparatus the reacting stream is successively preheated within the catalyst chamber, raised to a maximum temperature to increase the reaction rate, and then gradually lowered in temperature to increase the degree of conversion. The present scheme provides for net cooling beyond that which can be effected by the feed and by additions to the feedstream. Two separate coolants in two separate heat exchangers are provided in the reactor. Parallel concurrent flow is employed in both heat exchangers between the cold and hot streams. Further, the heat exchange between the cold and hot stream is indirect. The term indirect heat exchange applies to non-contact heat exchange between the feedstream flowing within a heat exchanger and the stream reacting and passing up through the catalyst on the outside of the heat exchanger, that is on the shell side. Similarly, there is indirect or non-contact heat exchange between a coolant stream from an external source such as water in the form of steam or liquid water or an organic liquid or other suitable fluid which is introduced into a separate second heat exchanger within the reactor and the stream reacting and passing up through the catalyst surrounding the second heat exchanger.

The present invention is suitable for use in carrying out a novel continuous water-gas shift conversion process for reacting a CO-rich feed gas and $H_2O$ together to produce hydrogen and carbon dioxide. By this process, about 70 mole percent or more of the CO in the CO-rich feed gas may be converted to $CO_2$. The process involves forming a CO-rich water-gas shift feedstream comprising carbon monoxide and steam, with or without supplemental liquid phase water. The shift feedstream, preferably at a temperature in the range of 350° to 620°F. and at a preferable mole ratio ($H_2O/CO$) in the range of about 2 to 5 is then introduced as a heat exchange fluid or coolant into the first heat exchanger. The heat exchanger may be of conventional design such as a tube coil, or tube bundle, or it may be as described herein. The heat exchanger is embedded in a water-gas shift catalyst, preferably contained in a single elongated cylindrical vessel. In the bed of catalyst there are three contiguous temperature controlled sections referred to as the adiabatic, isothermal and equilibrium-limited sections.

The feedstream is introduced into a first heat exchanger embedded in catalyst in the equilibrium limited section of the reactor. The shift feed stream is heated, preferably to an exit temperature in the range of about 380° to 760°F. by absorbing heat from a gas stream undergoing exothermic reaction within said catalyst. Supplemental $H_2O$ may be added to the unreacted shift feedstream entering or leaving the first heat exchanger. Preferably at substantially the same exit temperature as it leaves the first heat exchanger, the preheated unreacted feedstream is then passed into a fixed bed of water-gas shift catalyst in the adiabatic section of the catalyst bed.

In the adiabatic section of the catalyst bed, the temperature of the entering shift feedstream is quickly raised to the desired maximum operating temperature by the heat of reaction of the exothermic water-gas shift. This temperature is the maximum temperature that the catalyst will withstand continuously without excessive loss of activity. The maximum continuous operating temperature for most conventional iron oxide-chromium oxide shift catalyst is about 930°F. Higher temperatures may be reached with other shift catalysts.

The reacting shift feedstream leaving the adiabatic section at a temperature in the range of about 600° to 950°F. is then passed through the catalyst in the isothermal section of the catalyst bed at substantially the same exit temperature it had when it left said adiabatic section. A second heat exchanger is embedded in the catalyst in said isothermal section. $H_2O$ or other suitable fluid coolant from an external source is introduced into said second heat exchanger in concurrent flow and indirect heat exchange with said reacting feedstream so as to maintain said reacting feedstream at a constant temperature through said isothermal section.

The reacting gases leave the isothermal section and at substantially the same exit temperature therefrom are passed into the catalyst on the shell side of the first heat exchanger which was previously referred to as the equilibrium-limited section. The water-gas shift reaction continues in said section at a reduced rate due to the lower temperature and reduced concentration of CO. The amount of CO conversion is facilitated in this last section before discharge by progressively lowering the temperature of the reactants along the length of the section as a function of CO concentration. At any specific point along the length of the equilibrium-limited section, the actual temperature of the feed gas is held in the range of about 20° to 160°F. and preferably 50°F. lower than the apparent equilibrium temperature corresponding to the equilibrium constant for the composition of the reacting feed gas at that point. The temperature of the product gas leaving the equilibrium-limited section, and discharged from the reactor, is preferably in the range of about 400° to 780° F.

The aforesaid first heat exchanger is located in the equilibrium-limited section requiring the greatest dissipation of heat. The shift feedstream at its lowest temperature enters the system at the beginning of the equilibrium-limited section and flows through the heat exchanger concurrent to the direction of flow of reactants in the reactor catalyst bed. Thus, the maximum temperature differences between the feedstream coolant and the catalyst bed are available at the region requiring the greatest heat flux, and the temperature difference decreases downstream just as does the required heat flux. Similarly, the largest temperature difference in the second heat exchanger located in the isothermal section is at the entrance where the heat flux requirement is greatest.

The heat transfer requirements in both the isothermal and equilibrium-limited sections may be shown to be of an exponentially decreasing function versus length. These requirements are matched by indirect concurrent flow heat transfer between the gases undergoing water-gas shift reaction and the two coolant streams. In the preferred embodiment of my invention the coolant in the equilibrium controlled section comprises a continuous stream of comparatively cooler feed gas plus minor amounts of supplemental $H_2O$, if necessary. Thus the feed gas mixture is heated by the reacting feed gas which it cools, at a decided economic advantage. Further, a costly external heat exchanger is avoided. Alternatively, the coolant streams in the first and second heat exchangers may be interchanged. A typical temperature profile for the gases undergoing shift reaction along the length of the shift converter is shown in FIG. 9 of the drawing.

The water-gas shift reaction takes place in the catalyst filled plug-flow shift converter at a temperature in the range of about 250° to 1,500°F., for example, 300° to 1,100°F., depending upon the temperature resistance of the catalyst. The pressure is in the range of about 1 to 350 atmospheres for example, 5 to 200 atmospheres and preferably in the range of about 20 to 160 atmospheres. The flow of the reactants longitudinally through the reactor on the shell side of the heat exchanger is orderly with "nonbacking," i.e., no element of fluid overtaking any other element, also referred to as "plug flow." The residence time in the reactor is the same for all elements of the fluid.

As previously explained, in the adiabatic section of the catalyst bed, the temperature of the preheated shift feed gas mixture is quickly raised to the maximum. The reacting feed gas mixture is then passed through a first heat exchange zone, referred to previously as the isothermal section. There the maximum temperature is held constant while the shift reaction continues until the actual composition of the reacting gases closely approaches the equilibrium composition of the mixture for the pressure and temperature of the isothermal section. Normally, the actual composition at the end of the isothermal section will equal the equilibrium composition for a temperature in the range of about 20° to 160°F. and preferably about 50°F. above the isothermal section temperature.

As previously explained, to attain further CO conversion, the reacting gases are passed through a second heat exchange zone, referred to as the equilibrium-limited section. The water-gas shift reaction continues in the equilibrium-limited section at a reduced rate due to the lower temperature and reduced concentration of CO. The amount of CO conversion is facilitated in this section by decreasing the space velocity and by progressively lowering the temperature of the reacting feed gas along the length of the section as a function of CO concentration. At any specific point along the length of the equilibrium-limited section, the actual temperature of the feed gas is held in the range of about 20° to 160°F. and preferably about 50°F., lower than the apparent equilibrium temperature corresponding to the equilibrium constant for the composition of the reacting feed gas at that point. The heat transfer requirements in the isothermal and equilibrium-limited zones may be shown to be of an exponentially decreasing function versus length. These requirements are matched by indirect concurrent flow heat transfer between the gases under-going water-gas shift reaction and the heat exchange fluids.

A typical temperature profile for reacting gases undergoing shift reaction along the length of the shift converter is shown in FIG. 9 of the drawing and will be discussed later with respect to the example. Thus in a preferred embodiment of my invention the feedstream to my chemical reactor comprises a continuous stream of reactants which is introduced into a heat exchange assembly as the heat exchange fluid before being introduced into a reaction zone where it is chemically reacted. The feed gas mixture is thereby heated by the reacting feed gas which it cools, at a decided economic advantage.

Conventional water-gas shift conversion catalysts may be employed in the process of our invention. For example, over a temperature range of about 600° to 1,050°F. a suitable catalyst comprises iron oxide promoted by 1 to 15 percent by weight of an oxide of a metal such as chromium, thorium, uranium, beryllium and antimony. This catalyst is characterized by heat stability (up to 1,184°F.), high activity, good selectivity, resistance to poisoning, constant volume and long life. For low temperature shift reactions over a temperature range of about 350° to 650°F. the catalyst may comprise mixtures of copper and zinc oxide in a weight ratio of about one-half to three parts zinc to one part copper. Catalyst may be obtained in the form of pellets or irregular fragments that range in size from about 5 to 10 mm. and larger, or tablets ranging from ¼ to ⅜ inch diameter.

The present invention constitutes a preferred apparatus for carrying out the aforesaid process. It essentially comprises a closed cylindrical vertical pressure vessel containing a removable axial spine which extends through the top and bottom heads of said vessel. Two separate heat exchangers are embedded in catalyst within said vessel and are supported by said axial spine as a removable unit and are in communication therewith. The axial spine contains passageways for separately introducing and removing two separate coolant streams into said heat exchangers. The first coolant stream consists of unreacted fresh feedstream which is thereby preheated before it is introduced into the catalyst surrounding each heat exchanger. The second coolant stream is liquid water, steam or other suitable fluid from an external source. Both coolant streams pass in non-contact concurrent heat exchange with the feedstream undergoing exothermic chemical reaction as it passes up through the catalyst surrounding each heat exchanger. The product stream leaves from the top of the catalyst and is discharged through an exit port in the top head of the vessel.

DESCRIPTION OF THE DRAWING

A more complete understanding of the invention may be had by reference to the accompanying drawing which illustrates in FIGS. 1 through 8 a preferred embodiment of this invention.

As shown in FIGS. 1 to 5 inclusive, exothermic reaction vessel 11 is a catalyst filled elongated vertical pressure vessel and is represented in this embodiment as an upright cylindrical gas-tight metal column essentially comprising: cylindrical shell body 12, top cover 13, bottom cover 14, support legs 15, spine sub-assembly 16, upper heat exchanger 17 and lower heat exchanger 18.

Cylindrical shell body 12 is provided with circumferential body flanges 19 and 20 respectively located near its upper and lower end portions. Top cover 13 is provided with circumferential cover flange 21, discharge port 22 for the product gas, and expandable seal 23 through which passes the upper end of the spine sub-assembly 16. Bottom cover 14 is provided with circumferential cover flange 24, water atomizer 25 and center opening 26 through which extends the lower end of spine sub-assembly 16 by way of pressure tight flexible seal 27. Support legs 15 are attached to the lower end of shell body 12, and hold the column in an upright position.

The upper end of spine sub-assembly 16 essentially comprises two concentric pipes, e.g., center pipe 28 and outer pipe 29. These pipes are spaced apart by means of spacers, thereby providing an annulus passage 30 along the length of the spine which discharges into center ring 31 in plenum chamber 32. Chamber 32 is bounded by the inner concave portion of bottom cover 14 and perforated catalyst support plate 33. Annulus passage 30 is closed at the top end by annulus plate 34 and open at the bottom end. Partition plate 35 divides center pipe 28 into two separate parts, an upper section and a lower section.

The lower end of spine sub-assembly 16 essentially comprises axial inlet pipe 36, center pipe 28 which is sealed to bottom cover 14 by means of expandible seal 27, and flanged "T"-fitting 39 containing exit port 40. "T"-fitting 39 is sealed to axial inlet pipe 36 by means of expandible seal 41 which is held in place by flange 42 and flanged elbow 43. Cover plate 44 caps the upper end of axial pipe 36.

The two superimposed heat exchangers, e.g., upper heat exchanger 17 and lower heat exchanger 18 are supported respectively by four pairs of upper I-beam cantilevered supports 51. Each pair of I-beam supports are fixed to outer pipe 29 for example by welding and are spaced 90° apart. Thus, spine sub-assembly 16 with attached heat exchangers 17 and 18 form a single unit which may be easily withdrawn from the top of cylindrical body 12 after seal 23 is detached from the flanged end of center pipe 16 and upper cover 13 is removed. However, before removing spine sub-assembly 16, shell 12 is first emptied of catalyst from the bottom. This may be done by removing seals 27 and 41, "T"-fitting 39, bottom cover 14, perforated catalyst support plate 33 and catalyst support plate ring 31.

Upper heat exchanger 17 comprises four sets of vertical heat exchange elements 52. Each set of elements is spaced 90° from the next set and contains a plurality e.g., six are shown for illustrative purposes, of heat exchange elements of varying sizes. Heat exchange element 52 rests on an I-beam support 50 and is fed by one of four cantilevered lower feed manifolds 53 (see FIG. 2). While one end of each feed manifold 53 is closed, the other end is open and extends radially from the upper section of center pipe 28 and is in communication therewith, thereby forming four interconnecting passageways 54. Feed manifolds 53 are passed through the openings in the wall of outer pipe 29. The openings are then tightly sealed, for example by welding, to prevent leakage of the gas flowing down annulus passage 30. Similarly, the four sets of heat exchange elements 52 discharge into the four cantilevered upper return manifolds 55, spaced 90° apart (see FIG. 3). While one end of each return manifold 55 is closed the other end extends radially from outer pipe 29 and is in communication therewith, thereby forming four interconnecting passageways 56.

In the same manner as described for upper heat exchanger 17, the lower heat exchanger 18 comprises four sets of vertical heat exchange elements 57. Each set of heat exchange elements is spaced 90° apart and contains a plurality e.g., six are shown for illustrative purposes, of heat exchange elements 57 of varying sizes which rest on I-beam supports 51 and which are fed by one of four cantilevered lower feed manifolds 58. While the outer end of each feed manifold 58 is sealed, the other end is open and extends radially from axial pipe 36 and is in communication therewith, thereby forming four interconnecting passages 59. Similarly, the four sets of heat exchange elements 57 discharge into four cantilevered upper return manifolds 60 spaced 90° apart. While the outer end of each feed manifold 60 is sealed, the other end is open and extends radially from the bottom section of central pipe 28 and is in communication therewith, thereby forming the four interconnecting passages 61.

Feed manifolds 58 and return manifolds 60 are passed through wall openings in outer pipe 29 and the bottom section of central pipe 28. The openings are then tightly sealed, for example by welding, to prevent leakage of the gas flowing down annulus passage 30.

FIGS. 6 to 8 inclusive show a typical heat exchange element 52 or 57 comprising a metal plate containing in this embodiment ten vertical cooling channels 65 connected together at the bottom by a horizontal coolant distribution channel 66, at the top of a horizontal coolant collection channel 67 and in between by two horizontal pressure equalizing channels 68. The coolant enters the heat exchange element by way of flanged pipe 69 and departs by way of flanged pipe 70. The heat exchange elements 52 and 57 are fastened respectively to I-beams 50 and 51 by means of angle clips 71. Flanged pipe 69 at the inlet to each heat exchange element is connected to lower feed manifolds 53 and 58 by means of adapters 72 and 73 respectively. Similarly, flanged pipe 70 at the discharge end of each heat exchange element is connected to upper discharge manifolds 55 and 60 by means of expandable adapters 74 and 75 respectively.

Heat exchange elements 52 or 57 may be made by forming a left hand and right hand pattern of semicircular channels in two light gauge metal sheets, assembling the sheets together to form a pattern of circular channels and land areas, and fusing the land areas together. Alternately, tubing may be employed.

Although not shown in the drawing, during operation exothermic reaction vessel 11 is preferably covered on the outside with suitable insulation to prevent heat loss to the surroundings. Conventional high temperature insulation may be used, e.g., rock wool, glass wool or bonded insulation of diatomacious silica plus asbestos fiber.

To operate exothermic reaction vessel 11 as a catalytic water-gas shift converter, catalyst support plate 33, retainer ring 31 and bottom cover 14 are put in place. Spine sub-assembly 16 is then inserted into shell 12 until I-beam 51 rests on a bottom support, for example inside ledge 80. The bottom end of outside pipe 29 slides past the top of ring 31 on the inside and near the top. Water atomizer 25 is pushed through gas-tight sleeve bushings located in bottom head 14. Flexible seals 27 and 41 are assembled along with "T"-fitting 39 and 90° elbow 43. With top cover 13 off, conventional iron-oxide-chromium oxide catalyst tablets about ¼ to ⅜ inch in diameter are poured into shell 12 to fill the entire space on the shell side of the vessel which is unoccupied by spine-assembly 16. Upper plenum chamber 82 between upper cover 13 and upper return manifold 55 and lower plenum chamber 32 are free from catalyst. Pressure vessel 11 is then closed by putting top cover 13 in place, and clamping flexible gas-tight seal 23 against the flanged end of center pipe 28.

Water-gas shift feed stream comprising a CO-rich gas mixture including supplemental steam or atomized water is passed down center pipe 28 through passages 54 and into the four bottom feed manifolds 53 of upper heat exchanger 17. The feed stream is then passed through holes 83 in feed manifolds 53, adapters 72, and into a plurality e.g., 24 are shown for illustrative purposes of heat exchange elements 52 by way of flanged inlet pipes 69. Then the fresh unreacted feedstream is passed up through vertical passages 65 (see FIG. 6) in heat exchange elements 52 in indirect concurrent heat exchange with the reactant gases undergoing catalytic water-gas shift conversion on the outside of heat exchange elements 52. The feedstream is then passed out of heat exchange elements 52 through flanged pipes 70. It is then passed into the four upper return manifolds 55 by way of expandible adapters 74 and holes 85. The temperature profile at the fresh unreacted feedstream as it passes through upper heat exchanger 17 is shown by line $(a)$ in FIG. 9.

The feedstream is passed out of upper heat exchanger 17 through holes 56 at the ends of upper return manifolds 55, down through annulus 30 and then into bottom plenum chamber 32 by way of a plurality of holes 86 in the walls of ring 31. If desired, atomized water or steam from line 25 may be then mixed with the feedstream in bottom plenum chamber 32, before the mixture is passed through openings in catalyst support plate 33 and then up through the catalyst in the reaction vessel.

The feedstream is passed longitudinally up through the entire length of the pressure vessel on the shell side where it undergoes catalytic water-gas shift reaction. The flow of the reactants through the reactor is orderly with "nonbackmix," i.e., no element of fluid overtaking any other element, also referred to as "plug flow." The residence time in the reactor is the same for all elements of the fluid.

The temperature profile of the reactant gas as it passes on the shell side through pressure vessel 11 is shown as line $(b)$ in FIG. 9 as a function of the volume of catalyst contacted in cubic feet. $V_1$ represents the volume of catalyst in the adiabatic section of the shift converter through which the reactant gases pass. The adiabatic section is bounded by the catalyst support plate and the lower manifold 58 of the lower heat exchanger 18. There is substantially no heat exchange in this area and the temperature of the reactants may be increased to a maximum that the catalyst will withstand over an extended period without destruction. Temperature control in this area is exercised primarily by controlling the inlet temperature and composition of the reactants, and also the space velocity.

The hot reactant gases leave the adiabatic section and are passed into the isothermal section on the shell side of lower heat exchanger 18 where the reaction continues while the temperature is held substantially constant at the maximum by lower heat exchanger 18. The isothermal section is bounded by the upper end of the adiabatic section and the top of lower heat exchanger 18. The volume of catalyst contacted by the gases leaving the isothermal section is shown in FIG. 9 as $V_2 - V_1$.

The reacting feedstream is maintained at substantially constant temperature in the isothermal section by noncontact concurrent flow heat exchange with a separate stream of coolant from an external source. The coolant stream is passed through heat exchanger 18 by way of 90° elbow 43, axial pipe 36, passageways 59, lower manifolds 58, holes 86, expandable adapters 73, heat exchange elements 57, adapters 75 and upper manifolds 60. The stream of coolant absorbs heat from the reacting feedstream and then passes out of the reaction vessel by way of passageways 61, lower section of center pipe 28, annular passage 87 between axial pipe 36 and center pipe 28, and flanged exit nozzle 40. The temperature profile of the coolant streams as it passes through heat exchanger 18 is shown in FIG. 9 as line (c).

The reactant gases are then flowed freely into the equilibrium-limited section on the shell side of upper heat exchanger 17 where the reaction continues while the temperature is reduced exponentially at a specific rate. The reactant gases pass in noncontact counterflow heat exchange with incoming fresh unreacted feedstream as described previously. The equilibrium-limited section is bounded by the upper end of the isothermal section and the top of the upper heat exchanger 17. Temperature is controlled in this section by upper heat exchanger 17. The total volume of catalyst contacted by the gases leaving this last section is shown in FIG. 9 as $V_3 - V_2$.

The cooled product gases leave the catalyst and enter plenum chamber 82 between upper cover 13 and the top of the heat exchanger 17 where they are finally discharged through exit port 22.

EXAMPLE

Twenty-five million standard cubic feet per day (MMSCFD) of hydrogen may be produced by an apparatus similar to that shown in the drawing. For example, the water-gas shift converter 11 may comprise a vertical steel pressure vessel 8½ feet in diameter by 48 feet high. Heat exchangers 17 and 18 comprise respectively 4,500 ft² and 760 ft² of external cooling area. The catalyst on the shell side of the heat exchangers is iron-oxide 85 to 95 weight percent and chromium oxide 5 to 15 weight percent. The volume of the catalyst in the adiabatic, isothermal, and equilibrium-controlled sections of the shift converter is shown in Table I. 29.3 MMSCFD of saturated water-gas shift feedstream (dry basis) at a temperature of 411°F. and a pressure of 515 psig are mixed with 2.48 thousand (M) lbs. per day of $H_2O$. The feed gas mixture having the composition shown in Table I is introduced into the lower feed manifold 53 of upper heat exchanger 17 by way of center pipe 28. The shift feedstream absorbs heat as it passes up through heat exchanger 17 and leaves at a temperature of 660°F. Super heated steam of 915°F. is added to the extent of 16.8 thousand (M) lbs. per day by way of line 25.

The shift feedstream then enters the adiabatic section of the reactor at a temperature of about 695°F. where catalytic water-gas shift reaction takes place and the temperature is increased to 930°F. The reacting gas is then passed into the isothermal section where the temperature is maintained at 930°F. until 81.9 mole percent of the CO in the feed is converted. Then, the reacting gases are passed through the equilibrium-limited section where the temperature is reduced exponentially. At any point in this section the temperature is controlled by heat exchange so that it is less than the temperature corresponding to the equilibrium constant for the composition of the reacting gas at that point by a small amount within the range of 20° to 160°F. and preferably about 50°F. lower. The product gas exits from discharge port 22 at a temperature of 675°F. 90.4 mole percent of the CO in the feedstream is converted.

See Table I for a summary of the operating conditions and a gas analysis of the feedstream at various locations in shift converter 11.

The advantages of my invention are not limited to catalytic water-gas shift conversion. The principles of heat exchange described can be applied to other fluids and other reactions including gaseous and liquid fuels and exothermic and endothermic reactions with or without catalyst. The invention therefore is not restricted to the particular reaction in the above example, namely water-gas shift reaction, nor to the specific choice of $H_2O$ as the temperature moderator. The specific example does, however, illustrate a practical construction of a water-gas shift converter which can be applied to various problems by those skilled in the art. More than two heat exchange units may be employed of varying sizes and number of elements, depending upon the heat exchange requirements.

Further, depending upon the job to be done by the apparatus, the diameter of the various sections of the vessel may differ, the vessel may lie horizontal instead of vertical, the flow of the streams in the apparatus may be reversed, and an inverted configuration may be provided for by which the product exits from the reactor at the bottom. Optionally, the vessel may be jacketed with a suitable thermal insulation e.g., rock wool or diatomacious silica plus asbestos fiber so as to reduce heat loss to a negligible quantity.

TABLE I

|  | Feed Gas in Manifold 53 | Feed Gas in Plenum Chamber 32 | Reactant Gas Leaving Adiabatic Section | Reactant Gas Leaving Isothermal Section | Product Gas Leaving Equilibrium Limited Section | Overall |
| --- | --- | --- | --- | --- | --- | --- |
| Reactor Volume, Cu. Ft. | — | — | — | — | — | 2960 |
| Catalyst Volume Cu. Ft. | — | — | 387 | 175 | 994 | 1556 |
| Temperature, °F. | 411 | 695 | 930 | 930 | 675 | — |
| Pressure, psig | 515 | 512 | 512 | — | 465 | — |
| Gas Composition Mole % Feed, Dry Basis |  |  |  |  |  |  |

TABLE I

|  | Feed Gas in Manifold 53 | Feed Gas in Plenum Chamber 32 | Reactant Gas Leaving Adiabatic Section | Reactant Gas Leaving Isothermal Section | Product Gas Leaving Equilibrium Limited Section | Overall |
|---|---|---|---|---|---|---|
| CO | 48.7 | 48.7 | 15.8 | 8.8 | 4.7 | — |
| $CO_2$ | 3.8 | 3.8 | 36.7 | 43.7 | 47.8 | — |
| $H_2$ | 45.8 | 45.8 | 78.7 | 85.7 | 89.9 | — |
| Inerts | 1.7 | 1.7 | 1.7 | 1.7 | 1.7 | — |
| $H_2O$ | 119.5 | 151.3 | 118.4 | 111.4 | 107.3 | — |
| $H_2O$/CO Mole Ratio | 2.5 | 3.1 | 7.5 | 12.7 | 22.8 | — |
| $H_2O$ Added, % Mole Dry Feed | 4.5 | 31.8 | — | — | — | 36.3 |
| Space Velocity, SCFH Dry Feed/Ft.$^3$ Cat. | — | — | 3120 | 6910 | 1215 | 778 |
| Conversion, % Mole CO In Dry Feed | — | — | 67.6 | 81.9 | 90.4 | 90.4 |

I claim:

1. Heat exchange apparatus comprising a closed vessel having a body section, a top cover equipped with an exit port, and a bottom cover; an axial spine passing through said top and bottom covers and extending along the length of said vessel and structurally supporting other internal elements within said vessel as a removable unit; means for sealing the top and bottom ends of said axial spine respectively to the top and bottom covers so as to permit free expansion of said axial spine; said axial spine comprising a center pipe with an internal partition plate for dividing said center pipe into upper and lower sections, said upper section having an open upper end which serves as the inlet for fresh unreacted feedstream, a "T"-fitting containing a side exit port attached to the lower end of said lower section, a concentric coaxial outer pipe disposed longitudinally about the outside of said center pipe and spacers for providing a first annular passage therebetween, said first annular passage being closed at the top by an annulus plate and opening at the bottom into a bottom chamber, said bottom chamber being bounded by the bottom cover and a perforated catalyst support plate, a concentric axial inlet pipe disposed longitudinally within the bottom section of said center pipe providing a second annular passage therebetween, said axial inlet pipe having a cover plate capping the upper end and an open bottom end for the ingress of a separate stream of heat exchange fluid from an external source, an expandible seal connecting the lower outside end of said axial inlet pipe to the lower end of said "T"-fitting;

a plurality of separate upper and lower heat exchange means embedded in catalyst within said vessel and attached to said axial spine, at least one of said upper heat exchange means having an inlet passage in communication with the upper section of said center pipe for receiving said fresh unreacted feedstream and having an outlet passage in communication with said first annular passage through which the unreacted feedstream is then passed to said bottom chamber, at least one of said separate lower heat exchange means having an inlet passage in communication with the upper end of said axial inlet pipe for receiving said separate stream of heat exchange fluid from an external source and having an outlet passage in communication with the lower section of said center pipe through which said separate stream of heat exchange fluid is passed into said second annular passage and out through the exit port in said "T"-fitting located near the lower end of said axial pipe; wherein the unreacted feedstream in the bottom chamber may be passed through the catalyst in the body section of the vessel where it undergoes chemical reaction to the exit port in the top cover in indirect concurrent flow heat exchange successively with the separate stream of heat exchange fluid from an external source flowing within said separate lower heat exchange means and with the unreacted feedstream flowing within said separate upper heat exchange means.

2. A heat exchange apparatus according to claim 1 with the addition of means for separately introducing a temperature moderating fluid into said bottom chamber.

3. A heat exchange apparatus according to claim 1 wherein said plurality of separate heat exchange means comprises an upper heat exchanger comprising a plurality of upper inlet manifolds extending from the bottom of the upper section of said central pipe and in communication therewith, a plurality of upper outlet manifolds extending from the top of the upper section of said annular passage and in communication therewith, and a plurality of upper heat exchange passages disposed between said upper inlet and outlet manifolds and in communication therewith, and a lower heat exchanger comprising a plurality of lower inlet manifolds extending from the upper end of said axial pipe and in communication therewith, a plurality of lower outlet manifolds extending from the lower section of said central pipe and in communication therewith, and a plurality of lower heat exchange passages disposed between said lower inlet and outlet manifolds and in communication therewith; and an outlet conduit in said top head; wherein said fresh reactant feed stream enters through said upper section of central pipe and flows up through said upper heat exchanger and down through said annular passage into the bottom chamber, then up through said catalyst in indirect concurrent heat exchange first with the heat exchange fluid flowing up through said lower heat exchanger and then with the feed stream flowing up through the upper heat exchanger and finally the stream is discharged through said exit port in said top head.

* * * * *